US012491152B2

(12) United States Patent
Macktoom et al.

(10) Patent No.: US 12,491,152 B2
(45) Date of Patent: Dec. 9, 2025

(54) ANTIPERSPIRANT/DEODORANT COMPOSITIONS

(71) Applicant: Revlon Consumer Products Corporation, New York, NY (US)

(72) Inventors: Rimsha Macktoom, North Brunswick, NJ (US); Jennifer Roman, Edison, NJ (US)

(73) Assignee: Revlon Consumer Products Corporation, New York, NY (US)

( * ) Notice: Subject to any disclaimer, the term of this patent is extended or adjusted under 35 U.S.C. 154(b) by 645 days.

(21) Appl. No.: 17/763,386

(22) PCT Filed: Oct. 16, 2020

(86) PCT No.: PCT/US2020/056062
§ 371 (c)(1),
(2) Date: Mar. 24, 2022

(87) PCT Pub. No.: WO2021/096638
PCT Pub. Date: May 20, 2021

(65) Prior Publication Data
US 2022/0401354 A1 Dec. 22, 2022

Related U.S. Application Data

(60) Provisional application No. 62/934,809, filed on Nov. 13, 2019.

(51) Int. Cl.
*A61K 8/9794* (2017.01)
*A61K 8/73* (2006.01)
*A61K 8/92* (2006.01)
*A61Q 15/00* (2006.01)

(52) U.S. Cl.
CPC ............ *A61K 8/9794* (2017.08); *A61K 8/732* (2013.01); *A61K 8/922* (2013.01); *A61Q 15/00* (2013.01)

(58) Field of Classification Search
None
See application file for complete search history.

(56) References Cited

U.S. PATENT DOCUMENTS

| | | | | |
|---|---|---|---|---|
| 10,758,476 | B1 * | 9/2020 | Moss | A61K 8/27 |
| 2005/0002872 | A1 | 1/2005 | Katz | |
| 2018/0168947 | A1 * | 6/2018 | Banowski | A61K 8/65 |
| 2019/0046424 | A1 | 2/2019 | Brodwick | |

FOREIGN PATENT DOCUMENTS

| | | |
|---|---|---|
| CN | 107669586 A | 2/2018 |
| WO | 2012059343 A1 | 5/2012 |
| WO | 2019016493 A1 | 1/2019 |
| WO | 2019182926 A1 | 9/2019 |

OTHER PUBLICATIONS

International Search Report and Written Opion received for International Application No. PCT/US2020/056062, mailed on Jan. 6, 2021, 10 pages.
Notes From My Dressing Table. "Lather Lavendar & Bergamot Natural Deoderant" a blog post. www.notesdeommydressingtable.com/2017/05/lather-lavender-bergamot-natural.html. May 2017.
Extended European Search Report issued in European Application No. 20888201.9, mailed on Nov. 16, 2023, 11 pages.
International Preliminary Report on Patentability issued in International Application No. PCT/US2020/056062, mailed on May 27, 2022, 8 pages.
International Search Report and Written Opinion received for International Application No. PCT/US2020/056062, mailed on Jan. 6, 2021, 10 pages.
"100% Natural Creme Deodorant", Mintel, Product Listing, 4 pages, retrieved from http://www.gnpd.com.
"Arrowroot Starch: Specification Sheet", Making Cosmetics Inc., Redmond, Washington, Jan. 25, 2019.
"Lather Lavender & Bergamot Natural Deodorant", Blog Post: Notes from my dressing table, posted May 23, 2017, 6 pages, retrieved from http://www.notesfrommydressingtable.com/2017/05/lather-lavender-bergamot-natural.html.
Wu , et al., "Interface Design and Reinforced Features of the Arrowroot (*Maranta arundinacea*) Starch/Polyester-Based Membranes: Preparation, Antioxidant Activity, and Cytocompatibility", Materials Science and Engineering C, vol. 70, pp. 54-61, 2017, Elsevier.
Office Action issued in European Patent Application No. 20888201.9, mailed on Mar. 12, 2025, 9 pages.
First Examination Report issued in Australian Patent Application No. 2020382526, mailed on Jun. 12, 2025, 3 pages.

* cited by examiner

*Primary Examiner* — Robert A Wax
*Assistant Examiner* — William Craigo
(74) *Attorney, Agent, or Firm* — Dorsey & Whitney LLP

(57) ABSTRACT

Antiperspirant/deodorant compositions are described. Said antiperspirant/deodorant compositions comprise, in a cosmetically acceptable medium, (a) at least one cosmetic ingredient obtained from Bamboo, (b) at least one cosmetic ingredient obtained from *Maranta arundinaceae* (Arrowroot); and (c) at least one natural starch. These antiperspirant/deodorant compositions are useful in reducing body odor and in wetness absorption. A method for the cosmetic treatment of body odors, in particular axillary odors, which includes applying, to the skin, in particular the axillae, these compositions is also described.

9 Claims, No Drawings

ANTIPERSPIRANT/DEODORANT COMPOSITIONS

This application is a national stage application under 35 U.S.C. § 371 of International Application No. PCT/US2020/056062, filed Oct. 16, 2020, entitled "ANTIPERSPIRANTS/DEODORANT COMPOSITIONS," which claims priority to U.S. Patent Application No. 62/934,809, filed Nov. 13, 2019.

TECHNICAL FIELD

Antiperspirant/deodorant compositions are described. Said antiperspirant/deodorant compositions comprise, in a cosmetically acceptable medium, (a) at least one cosmetic ingredient obtained from Bamboo, (b) at least one cosmetic ingredient obtained from *Maranta arundinaceae* (Arrowroot); and (c) at least one natural starch. These antiperspirant/deodorant compositions are useful in reducing body odor and in wetness absorption.

BACKGROUND

The information provided below is not admitted to be prior art to the present disclosure, but is provided solely to assist the understanding of the reader.

Deodorizing or masking of unpleasant body odor has been in practice for centuries.

Deodorants are preparations which have antimicrobial activity and which mask, remove, or decrease perspiration odor. Antiperspirants are substances which have astringent action and inhibit the flow of perspiration. Salts of metals such as aluminum, zirconium, zinc, etc. (for example, in the forms of aluminum chlorohydrate, aluminum chloride, aluminum chlorohydrate and aluminum-zirconium compounds, most notably aluminum zirconium tetrachlorohydrex gly), have astringent properties and are often used in antiperspirants.

Recently, concerns have been raised that aluminum can be absorbed into the bloodstream. Additionally, use of an aerosol antiperspirant containing aluminum allows for inhalation and may result in absorption of aluminum from the nasal recess.

There is therefore a need for antiperspirant/deodorant compositions, which are free of aluminum and aluminum zirconium salts, which have a high deodorizing effect against body odor for from about 4 to about 24 hours after application and, which are stable, homogeneous and exhibit a proper sensory feeling.

SUMMARY

Described herein is an antiperspirant/deodorant composition comprising, in a cosmetically acceptable medium, (a) at least one cosmetic ingredient obtained from Bamboo, (b) at least one cosmetic ingredient obtained from *Maranta arundinaceae* (Arrowroot); and (c) at least one natural starch.

In an embodiment, the at least one cosmetic ingredient obtained from Bamboo (a) is selected from *Bambusa arundinacea* Seed Extract, *Bambusa arundinacea* Juice, *Bambusa arundinacea* Leaf Extract, *Bambusa arundinacea* Sap Extract, *Bambusa arundinacea* Shoot Extract, *Bambusa arundinacea* Stem Extract, *Bambusa arundinacea* Stem Powder, *Bambusa textilis* Stem Extract, *Bambusa vulgaris* Seed Extract, *Bambusa vulgaris* Callus Culture Extract, *Bambusa vulgaris* Juice, *Bambusa vulgaris* Leaf Extract, *Bambusa vulgaris* Sap Extract, *Bambusa vulgaris* Shoot Extract, *Bambusa vulgaris* Stem Extract, *Bambusa vulgaris* Stem Powder, or mixtures thereof.

In an embodiment, the at least one cosmetic ingredient obtained from *Maranta arundinacea* (Arrowroot) (b) is selected from *Maranta arundinacea* (Arrowroot) Leaf Extract, *Maranta arundinacea* (Arrowroot) Root Extract, *Maranta arundinacea* (Arrowroot) Root Powder, or mixtures thereof.

In an embodiment, the natural starch (c) is selected from maize (corn), rice, tapioca, cassava, barley, potato, wheat, sorghum, palm, pea, or mixtures thereof.

In an embodiment, at least one cosmetic ingredient obtained from Bamboo (a) is present at a concentration ranging from about 0.1 to about 10 wt. %, based on the total weight of the composition.

In an embodiment, the at least one cosmetic ingredient obtained from *Maranta arundinacea* (Arrowroot) (b) is present at a concentration ranging from about 0.1 to about 40 wt. %, based on the total weight of the composition.

In an embodiment, the natural starch (c) is present at a concentration ranging from about 1 to about 50 wt. %, based on the total weight of the composition.

In an embodiment, the antiperspirant/deodorant composition additionally includes at least one fatty compound selected from C6-C24 fatty alcohols, vegetable fats and oils, natural waxes or mixtures thereof.

In an embodiment, the at least one fatty compound selected from C6-C24 fatty alcohols, vegetable fats and oils and natural waxes is present at a total concentration ranging from about 1 to about 70 wt. %, based on the total weight of the composition.

An embodiment disclosed herein includes an antiperspirant/deodorant composition comprising, in a cosmetically acceptable medium:

a) at least one cosmetic ingredient obtained from Bamboo selected from *Bambusa arundinacea* Seed Extract, *Bambusa arundinacea* Juice, *Bambusa arundinacea* Leaf Extract, *Bambusa arundinacea* Sap Extract, *Bambusa arundinacea* Shoot Extract, *Bambusa arundinacea* Stem Extract, *Bambusa arundinacea* Stem Powder, *Bambusa textilis* Stem Extract, *Bambusa vulgaris* Seed Extract, *Bambusa vulgaris* Callus Culture Extract, *Bambusa vulgaris* Juice, *Bambusa vulgaris* Leaf Extract, *Bambusa vulgaris* Sap Extract, *Bambusa vulgaris* Shoot Extract, *Bambusa vulgaris* Stem Extract, *Bambusa vulgaris* Stem Powder, or mixtures thereof;

b) at least one cosmetic ingredient obtained from *Maranta arundinaceae* (Arrowroot) selected from *Maranta arundinacea* (Arrowroot) Leaf Extract, *Maranta arundinacea* (Arrowroot) Root Extract, *Maranta arundinacea* (Arrowroot) Root Powder, or mixtures thereof and c) at least one natural starch selected from maize (corn), rice, tapioca, cassava, barley, potato, wheat, sorghum, palm, pea, or mixtures thereof.

An embodiment disclosed herein includes an antiperspirant/deodorant composition comprising, in a cosmetically acceptable medium, based on the total weight of the composition:

a) about 0.1-10 wt. % of at least one cosmetic ingredient obtained from Bamboo;

b) about 0.1-40 wt. % of at least one cosmetic ingredient obtained from *Maranta arundinaceae* (Arrowroot); and c) about 1-50 wt. % of at least one natural starch.

An embodiment disclosed herein includes an antiperspirant/deodorant composition comprising, in a cosmetically acceptable medium, based on the total weight of the composition:

a) about 0.5-5 wt. % of at least one cosmetic ingredient obtained from Bamboo;
b) about 1-35 wt. % of at least one cosmetic ingredient obtained from *Maranta arundinaceae* (Arrowroot); and
c) about 5-40 wt. % of at least one natural starch.

An embodiment disclosed herein includes an antiperspirant/deodorant composition comprising, in a cosmetically acceptable medium, based on the total weight of the composition:
a) about 0.5-5 wt. % of at least one cosmetic ingredient obtained from Bamboo selected from *Bambusa arundinacea* Seed Extract, *Bambusa arundinacea* Juice, *Bambusa arundinacea* Leaf Extract, *Bambusa arundinacea* Sap Extract, *Bambusa arundinacea* Shoot Extract, *Bambusa arundinacea* Stem Extract, *Bambusa arundinacea* Stem Powder, *Bambusa textilis* Stem Extract, *Bambusa vulgaris* Seed Extract, *Bambusa vulgaris* Callus Culture Extract, *Bambusa vulgaris* Juice, *Bambusa vulgaris* Leaf Extract, *Bambusa vulgaris* Sap Extract, *Bambusa vulgaris* Shoot Extract, *Bambusa vulgaris* Stem Extract, *Bambusa vulgaris* Stem Powder, or mixtures thereof;
b) about 1-35 wt. % of at least one cosmetic ingredient obtained from *Maranta arundinaceae* (Arrowroot) selected from *Maranta arundinacea* (Arrowroot) Leaf Extract, *Maranta arundinacea* (Arrowroot) Root Extract, *Maranta arundinacea* (Arrowroot) Root Powder, or mixtures thereof, and
c) about 5-40 wt. % of at least one natural starch selected from maize (corn), rice, tapioca, cassava, barley, potato, wheat, sorghum, palm, pea, or mixtures thereof.

In an embodiment, the antiperspirant/deodorant composition is in the form of roll-on, gel, stick or cream.

An embodiment includes a method of cosmetically treating body odors, in particular axillary odors, which includes applying to the skin, in particular the axillae, an antiperspirant/deodorant composition as disclosed herein.

DETAILED DESCRIPTION

Embodiments of the present disclosure are discussed in detail below. In describing embodiments, specific terminology is employed for the sake of clarity. However, the disclosure is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the disclosure. While a number of embodiments and features are described herein, it is to be understood that the various features of the disclosure and aspects of embodiments, even if described separately, may be combined unless mutually exclusive or contrary to the specific description. All references cited herein are incorporated by reference as if each had been individually incorporated.

The terms "about" or "approximately" as used herein shall generally mean within 10 percent of a given value. Other than in the operating examples, or where otherwise indicated, all numbers expressing quantities of ingredients and/or reaction conditions are to be understood as being modified in all instances by the term "about".

The term "at least one" as used herein means one or more of the item to which the term makes reference.

The term "comprising" refers to optional compatible components/steps that can be used provided that the important ingredients/steps are present. The term "comprising" thus encompasses and includes the more restrictive terms "consisting of" and "consisting essentially of".

The term "natural starch" ("unmodified or native starch") as used herein refers to any starch which has not been subject to chemical, physical or enzymatic transformation by human intervention.

Cosmetically Acceptable Medium

The cosmetically acceptable medium is typically a medium comprising water and/or cosmetically acceptable organic solvents including, more particularly, alcohols such as ethyl alcohol, isopropyl alcohol, benzyl alcohol and phenylethyl alcohol; and glycols or glycol ethers such as, for example, glycerin (glycerol), monomethyl, monoethyl and monobutyl ethers of ethylene glycol, propylene glycol (including all possible isomers such as propane-1,2-diol, propane-1,3-diol, propane-2,2-diol or propane-1,1-diol) or its ethers such as, for example, monomethyl ether of propylene glycol, butylene glycol, or dipropylene glycol, as well as alkyl ethers of diethylene glycol such as, for example, monoethyl ether or monobutyl ether of diethylene glycol.

Bamboo

Bamboo is an ancient woody grass widely distributed in tropical, subtropical and mild temperate zones. It is a major non-wood forest product. There are about 1,200 species of bamboo in some 90 genera.

Typically, the at least one cosmetic ingredient obtained from Bamboo (a) is selected from cosmetic ingredients obtained from *Bambusa arundinacea, Bambusa textilis, Bambusa vulgaris*, or mixtures thereof.

In one embodiment, the at least one cosmetic ingredient obtained from Bamboo (a) is selected from *Bambusa arundinacea* Seed Extract, *Bambusa arundinacea* Juice, *Bambusa arundinacea* Leaf Extract, *Bambusa arundinacea* Sap Extract, *Bambusa arundinacea* Shoot Extract, *Bambusa arundinacea* Stem Extract, *Bambusa arundinacea* Stem Powder, *Bambusa textilis* Stem Extract, *Bambusa vulgaris* Seed Extract, *Bambusa vulgaris* Callus Culture Extract, *Bambusa vulgaris* Juice, *Bambusa vulgaris* Leaf Extract, *Bambusa vulgaris* Sap Extract, *Bambusa vulgaris* Shoot Extract, *Bambusa vulgaris* Stem Extract, *Bambusa vulgaris* Stem Powder, or mixtures thereof.

*Bambusa arundinacea* Seed Extract includes an extract of the seeds of *Bambusa arundinacea*. *Bambusa arundinacea* Juice includes a liquid expressed from the joints of the *Bambusa arundinacea* tree. *Bambusa arundinacea* Leaf Extract includes an extract of the leaves of *Bambusa arundinacea*. *Bambusa arundinacea* Sap Extract includes an extract of the sap of *Bambusa arundinacea*. *Bambusa arundinacea* Shoot Extract includes an extract of the shoots of *Bambusa arundinacea*. *Bambusa arundinacea* Stem Extract includes an extract of the stems of *Bambusa arundinacea*. *Bambusa arundinacea* Stem Powder includes a powder obtained from the dried, ground stems of *Bambusa arundinacea*. *Bambusa textilis* Stem Extract includes an extract of the stems of *Bambusa textilis*. *Bambusa vulgaris* Seed Extract includes an extract of the seeds of *Bambusa vulgaris*. *Bambusa vulgaris* Callus Culture Extract includes an extract of a culture of the callus of *Bambusa vulgaris*. *Bambusa vulgaris* Juice includes a liquid expressed from the joints of the *Bambusa arundinacea* vulgaris. *Bambusa vulgaris* Leaf Extract includes an extract of the leaves of *Bambusa vulgaris*. *Bambusa vulgaris* Sap Extract includes an extract of the sap of *Bambusa vulgaris*. *Bambusa vulgaris* Shoot Extract includes an extract of the shoots of *Bambusa vulgaris*. *Bambusa vulgaris* Stem Extract includes an extract of the stems of *Bambusa vulgaris*. *Bambusa vulgaris* Stem Powder includes a powder obtained from the dried, ground stems of *Bambusa vulgaris*.

In one embodiment, the antiperspirant/deodorant composition comprises *Bambusa arundinacea* Stem Powder.

Typically, in the antiperspirant/deodorant composition, the total amount of (a), the at least one cosmetic ingredient obtained from Bamboo, is in the range of about 0.1 to about 10 wt. %, or about 0.5 to about 5 wt. %, or about 0.8 to about 3 wt. %, based on the total weight of the composition.

*Maranta arundinacea* (Arrowroot)

*Maranta arundinacea* (Arrowroot) is a large, perennial herb found in rainforest habitats.

Typically, the at least one cosmetic ingredient obtained from *Maranta arundinacea* (Arrowroot) (b) is selected from *Maranta arundinacea* (Arrowroot) Leaf Extract, *Maranta arundinacea* (Arrowroot) Root Extract, *Maranta arundinacea* (Arrowroot) Root Powder, or mixtures thereof.

*Maranta arundinacea* (Arrowroot) Leaf Extract includes an extract of the leaves of *Maranta arundinacea*. *Maranta arundinacea* (Arrowroot) Root Extract includes an extract of the roots of *Maranta arundinacea*. *Maranta arundinacea* (Arrowroot) Root Powder includes a powder obtained from the dried, ground roots of *Maranta arundinacea*.

In one embodiment, the antiperspirant/deodorant composition comprises *Maranta arundinacea* (Arrowroot) Root Powder.

Typically, in the antiperspirant/deodorant composition, the total amount of (b), the at least one cosmetic ingredient obtained from *Maranta arundinacea* (Arrowroot), is in the range of about 0.1 to about 40 wt. %, or about 1 to about 35 wt. %, or about 3 to about 25 wt. %, or about 4 to about 20 wt. %, based on the total weight of the composition.

Natural Starch

Typically, natural starch ("unmodified or native starch") refers to any starch which has not been subject to chemical, physical or enzymatic transformation by human intervention.

Typically, the natural starch (c) is selected from maize (corn), rice, tapioca, cassava, barley, potato, wheat, sorghum, palm, pea, or mixtures thereof.

In one embodiment, the antiperspirant/deodorant composition comprises maize (corn) starch, tapioca starch, or mixtures thereof.

Typically, in the antiperspirant/deodorant composition, the total amount of (c), the natural starch, is in the range of about 1 to about 50 wt. %, or about 5 to about 40 wt. %, or about 12 to about 35 wt. %, or about 15 to about 32 wt. %, or about 20 to about 30 wt. %, based on the total weight of the composition.

C6-C24 Fatty Alcohol

Fatty alcohols include, but are not limited to, C6-C24 fatty alcohols from vegetable fats and oils such as those from cotton, safflower, coconut, rapeseed, linseed, palm, palm kernel, sunflower, olein, olive, olive pomace, castor oil, soy, tall oil, etc., possibly totally or partially hydrogenated, as well as purified or synthetic fatty alcohols such as caproyl alcohol, capryl alcohol, capric alcohol, lauryl alcohol, myristyl alcohol, palmytil (cetyl) alcohol, palmitoyl alcohol, stearyl alcohol, isostearyl alcohol, 2-octyldodecanol, 2-ethylhexanoyl alcohol, oleyl alcohol, ricinoleyl alcohol, elaidyl alcohol, petroselinic alcohol, linoleyl alcohol, linolenyl alcohol, arachidyl alcohol, gadoleyl alcohol, behenyl alcohol and erucyl alcohol, or technical grade mixtures.

Examples of suitable C6-C24 fatty alcohols include, but are not limited to, lauryl alcohol, myristyl alcohol, palmytil (cetyl) alcohol, palmitoyl alcohol, stearyl alcohol, cetearyl alcohol, isostearyl alcohol, 2-octyldodecanol, 2-ethylhexanoyl alcohol, oleyl alcohol, behenyl alcohol, erucyl alcohol, and mixtures thereof, in particular palmytil (cetyl) alcohol, palmitoyl alcohol, stearyl alcohol, cetearyl alcohol, isostearyl alcohol, 2-octyldodecanol, 2-ethylhexanoyl alcohol, oleyl alcohol, behenyl alcohol, erucyl alcohol, and mixtures thereof.

Typically, in the antiperspirant/deodorant composition, the amount of C6-C24 fatty alcohols is in the range of about 5 to about 20 wt. %, or about 6 to about 18 wt. %, or about 7 to about 15 wt. %, based on the total weight of the composition.

Vegetable Fats and Oils

For purposes of this disclosure, vegetable fats and oils are linear and/or branched esters, linear or branched, saturated and/or unsaturated alkanecarboxylic acids with a chain length of 1 up to 30 carbon atoms, saturated and/or unsaturated alcohols with a chain length of 1 up to 30 carbon atoms; or linear and/or branched esters of aromatic carboxylic acids, or saturated and/or unsaturated alcohols with a chain length of 1 up to 30 carbon atoms. These oils can be selected from the group including, for example, isopropyl myristate, isopropyl palmitate, isopropyl stearate, isopropyl oleate, n-butyl stearate, n-hexyl laurate, n-decyl oleate, isooctyl stearate, isononyl stearate, isononyl isononanoate, 2-ethylhexyl laurate, 2-ethylhexyl palmitate, 2-ethylhexyl cocoate, 2-hexyldecyl stearate, 2-ethylhexyl isostearate, 2-octyldodecyl palmitate, cetyl palmitate, stearyl palmitate, oleyl palmitate, oleyl oleate, oleyl erucate, erucyl oleate, erucyl erucate, as well as synthetic, semisynthetic and natural mixtures of esters, such as jojoba oil (a natural mixture of esters of monounsaturated monocarboxylic acids with a C18-C24 chain and monounsaturated monoalcohols and with a long C18-C24 chain).

Other examples of vegetable fats and oils include ester oils such as sugar esters or diesters of C12-C24 fatty acids. The term "sugar" means compounds comprising several alcohol functions, with or without an aldehyde or ketone function, and which comprise at least 4 carbon atoms. These sugars may be monosaccharides, oligosaccharides or polysaccharides.

Non-limiting examples of sugars that may be used according to the present disclosure include sucrose (or saccharose), glucose, galactose, ribose, fucose, maltose, fructose, mannose, arabinose, xylose and lactose, and derivatives thereof, including for example, alkyl derivatives such as methyl derivatives, for instance methylglucose. Non-limiting examples of the sugar esters of fatty acids that may be used according to this disclosure include those from the group comprising esters or mixtures of esters of sugars described above and of linear or branched, saturated or unsaturated C12-C24 fatty acids.

The esters may be chosen from mono-, di-, tri-, tetra- and polyesters, and mixtures thereof. These esters may be chosen from, for example, oleates, laurates, palmitates, myristates, behenates, cocoates, stearates, linoleates, linolenates, caprates and arachidonates, or mixtures thereof such as oleo-palmitate, oleo-stearate and palmito-stearate mixed esters. It will be noted that the sucrose, glucose or methylglucose monoesters and diesters and for example sucrose, glucose or methylglucose mono- or dioleates, stearates, behenates, oleopalmitates, linoleates, linolenates and oleo-stearates, constitute sugar esters or diesters of C12-C24 fatty acids that are suitable in the context of the present disclosure. A non-limiting example is methylglucose dioleate.

Other suitable oils of the type of esters of saturated alkane carboxylic acids and alcohols are fatty acid methyl esters, such as C6-C24 fatty acid methyl esters from animal and vegetable fats and oils such as those from cotton, safflower, coconut, rapeseed, linseed, palm, palm kernel, sunflower, olein, olive, olive pomace, castor oil, soy, tall oil, etc., possibly totally or partially hydrogenated, as well as purified or synthetic fatty acids such as caproic acid, caprylic acid, capric acid, lauric acid, myristic acid, palmitic acid (cetylic acid), palmitoleic acid, stearic acid, isostearic acid, 2-ethylhexanoic acid, oleic acid, ricinoleic acid, elaidic acid, petroselinic acid, linoleic acid, linolenic acid, arachidic acid, gadoleic acid, behenic acid and erucic acid, or mixtures thereof.

Other suitable vegetable fats and oils are fatty acid triglycerides, including, for example, linear and/or branched triglycerin esters, saturated and/or unsaturated alkanecarboxylic acids with a chain length of 6 up to 24 carbon atoms, such as of 10 up to 18 carbon atoms. The fatty acids esterifying the different positions of glycerin can be different, giving rise to a large amount of possible combinations, including positional combinations. The position of the different fatty acids in natural triglycerides is not random, but rather it depends on the origin of the fat. The most simple triglycerides are those constituted by a sole fatty acid.

Fatty acid triglycerides can be chosen, for example, from synthetic, semi-synthetic, purified, hydrogenated, partially hydrogenated and natural oils, as for example avocado oil, almond oil, hazelnut oil, babassu palm oil, borage oil, peanut oil, canola oil, hemp oil, milk thistle oil, safflower oil, chufa oil, coconut oil, rapeseed oil, black cumin oil, wheat germ oil, sunflower oil, linseed oil, macadamia nut oil, corn oil, walnut oil, olive oil and its by-products such as olive pomace oil, palm oil and its fractions such as palm olein and palm stearin, evening primrose oil, rosehip oil, castor oil, rice bran oil, apricot kernel oil, cottonseed oil, pumpkinseed oil, palm kernel oil and its fractions such as palm kernel olein and palm kernel stearin, grape seed oil, sesame oil, soy oil, cocoa butter, shea butter and the like. Synthetic, semi-synthetic or purified acid triglycerides may be chosen from, for example, Acetic/Linoleic/Palmitic Triglyceride, C8-12 Acid Triglyceride, C12-18 Acid Triglyceride, C18-36 Acid Triglyceride, Capric/Lauric/Myristic/Oleic Triglyceride, Caprylic/Capric/Lauric Triglyceride, Caprylic/Capric/Linoleic Triglyceride, Caprylic/Capric/Myristic/Stearic Triglyceride, Caprylic/Capric/Palmitic/Stearic Triglyceride, Caprylic/Capric/Stearic Triglyceride, Caprylic/Capric/Succinic Triglyceride, Caprylic/Capric Triglyceride, C10-40 Isoalkyl Acid Triglyceride, C10-18 Triglycerides, Docosahexenoic/Docosapentenoic/Oleic/Palmitic Triglyceride, Hydrogenated C12-18 Triglycerides, Jojoba Oil/Caprylic/Capric Triglyceride Esters, Lauric/Palmitic/Oleic Triglyceride, Mustelic/Palmitic Triglyceride, Oleic/Linoleic Triglyceride, Oleic/Palmitic/Lauric/Myristic/Linoleic Triglyceride, Oleic/Palmitic Triglyceride, Palmitic/Stearic Triglyceride, Ricinoleic/Caproic/Caprylic/Capric Triglyceride or mixtures thereof.

As used herein, "vegetable fats and oils" may exclude the "C6-C24 fatty alcohols" described above.

Typically, in the antiperspirant/deodorant composition, the amount of vegetable fats and oils is in the range of about 5 to about 60 wt. %, or about 10 to about 55 wt. %, or about 20 to about 50 wt. %, based on the total weight of the composition.

Natural Waxes

Natural waxes according to the present disclosure include, but are not limited to, candelilla wax, carnauba wax, Japan wax, esparto wax, cork wax, guaruma wax, rice wax, sugar cane wax, ouricury wax, montan wax, beeswax, shellac wax, espermaceti, wool lanolin (wax), uropygial fat wax, ceresin waxes, peat waxes, ozokerite, as well as chemically modified waxes (hard waxes) for example, montan wax esters, waxes obtained by the Fischer-Tropsch process, hydrogenated jojoba waxes and synthetic waxes.

Typically, in the antiperspirant/deodorant composition, the amount of natural waxes is in the range of about 0 to about 5 wt. %, or about 0.1 to about 3 wt. %, or about 0.2 to about 2 wt. %, based on the total weight of the composition.

Typically, in the antiperspirant/deodorant composition, the total amount of the at least one fatty compound selected from C6-C24 fatty alcohols, vegetable fats and oils and natural waxes, i.e. the sum of the amount of each single ingredient, is in the range of about 1 to about 70 wt. %, or about 3 to about 65 wt. %, or about 5 to about 65 wt. %, or about 10 to about 62 wt. %, based on the total weight of the composition.

The Antiperspirant/Deodorant Composition

The antiperspirant/deodorant composition may include, in a cosmetically acceptable medium:
  a) at least one cosmetic ingredient obtained from Bamboo;
  b) at least one cosmetic ingredient obtained from *Maranta arundinaceae* (Arrowroot); and
  c) at least one natural starch.

The at least one cosmetic ingredient obtained from Bamboo (a) may be present at a concentration ranging from about 0.1 to about 10 wt. %, or about 0.5 to about 5 wt. %, or about 0.8 to about 1 wt. %, based on the total weight of the composition.

The at least one cosmetic ingredient obtained from *Maranta arundinacea* (Arrowroot) (b) may be present at a concentration ranging from about 0.1 to about 40 wt. %, or about 1 to about 35 wt. %, or about 3 to about 25 wt. %, or about 4 to about 20 wt. %, based on the total weight of the composition.

The natural starch (c) may be present at a concentration ranging from about 1 to about 50 wt. %, or about 5 to about 40 wt. %, or about 12 to about 35 wt. %, or about 15 to about 32 wt. %, or about 20 to about 30 wt. %, based on the total weight of the composition.

In an embodiment, the antiperspirant/deodorant composition additionally comprises at least one fatty compound selected from C6-C24 fatty alcohols, vegetable fats and oils and natural waxes.

The at least one fatty compound selected from C6-C24 fatty alcohols, vegetable fats and oils and natural waxes may be present at a total concentration ranging from about 1 to about 70 wt. %, such as about 3 to about 68 wt. %, or about 20 to about 50 wt. %, based on the total weight of the composition.

In an embodiment, the antiperspirant/deodorant composition comprises, in a cosmetically acceptable medium:
  a) at least one cosmetic ingredient obtained from Bamboo selected from *Bambusa arundinacea* Seed Extract, *Bambusa arundinacea* Juice, *Bambusa arundinacea* Leaf Extract, *Bambusa arundinacea* Sap Extract, *Bambusa arundinacea* Shoot Extract, *Bambusa arundinacea* Stem Extract, *Bambusa arundinacea* Stem Powder, *Bambusa textilis* Stem Extract, *Bambusa vulgaris* Seed Extract, *Bambusa vulgaris* Callus Culture Extract, *Bambusa vulgaris* Juice, *Bambusa vulgaris* Leaf Extract, *Bambusa vulgaris* Sap Extract, *Bambusa vulgaris* Shoot Extract, *Bambusa vulgaris* Stem Extract, *Bambusa vulgaris* Stem Powder, or mixtures thereof;

b) at least one cosmetic ingredient obtained from *Maranta arundinaceae* (Arrowroot) selected from *Maranta arundinacea* (Arrowroot) Leaf Extract, *Maranta arundinacea* (Arrowroot) Root Extract, *Maranta arundinacea* (Arrowroot) Root Powder, or mixtures thereof, and
c) at least one natural starch selected from maize (corn), rice, tapioca, cassava, barley, potato, wheat, sorghum, palm, pea, or mixtures thereof.

In an embodiment, the antiperspirant/deodorant composition comprises, in a cosmetically acceptable medium, based on the total weight of the composition:
a) about 0.1-10 wt. % of at least one cosmetic ingredient obtained from Bamboo;
b) about 0.1-40 wt. % of at least one cosmetic ingredient obtained from *Maranta arundinaceae* (Arrowroot); and
c) about 1-50 wt. % of at least one natural starch.

In an embodiment, the antiperspirant/deodorant composition comprises, in a cosmetically acceptable medium, based on the total weight of the composition:
a) about 0.5-5 wt. % of at least one cosmetic ingredient obtained from Bamboo;
b) about 1-35 wt. % of at least one cosmetic ingredient obtained from *Maranta arundinaceae* (Arrowroot); and
c) about 5-40 wt. % of at least one natural starch.

In an embodiment, the antiperspirant/deodorant composition comprises, in a cosmetically acceptable medium, based on the total weight of the composition:
a) about 0.5-5 wt. % of at least one cosmetic ingredient obtained from Bamboo selected from *Bambusa arundinacea* Seed Extract, *Bambusa arundinacea* Juice, *Bambusa arundinacea* Leaf Extract, *Bambusa arundinacea* Sap Extract, *Bambusa arundinacea* Shoot Extract, *Bambusa arundinacea* Stem Extract, *Bambusa arundinacea* Stem Powder, *Bambusa textilis* Stem Extract, *Bambusa vulgaris* Seed Extract, *Bambusa vulgaris* Callus Culture Extract, *Bambusa vulgaris* Juice, *Bambusa vulgaris* Leaf Extract, *Bambusa vulgaris* Sap Extract, *Bambusa vulgaris* Shoot Extract, *Bambusa vulgaris* Stem Extract, *Bambusa vulgaris* Stem Powder, or mixtures thereof;
b) about 1-35 wt. % of at least one cosmetic ingredient obtained from *Maranta arundinaceae* (Arrowroot) selected from *Maranta arundinacea* (Arrowroot) Leaf Extract, *Maranta arundinacea* (Arrowroot) Root Extract, *Maranta arundinacea* (Arrowroot) Root Powder, or mixtures thereof, and
c) about 5-40 wt. % of at least one natural starch selected from maize (corn), rice, tapioca, cassava, barley, potato, wheat, sorghum, palm, pea, or mixtures thereof.

In an embodiment, the antiperspirant/deodorant composition comprises, in a cosmetically acceptable medium:
a) at least one cosmetic ingredient obtained from Bamboo;
b) at least one cosmetic ingredient obtained from *Maranta arundinaceae* (Arrowroot);
c) at least one natural starch; and
d) at least one fatty compound selected from C6-C24 fatty alcohols, vegetable fats and oils, natural waxes or mixtures thereof.

In an embodiment, the antiperspirant/deodorant composition comprises, in a cosmetically acceptable medium:
a) at least one cosmetic ingredient obtained from Bamboo selected from *Bambusa arundinacea* Seed Extract, *Bambusa arundinacea* Juice, *Bambusa arundinacea* Leaf Extract, *Bambusa arundinacea* Sap Extract, *Bambusa arundinacea* Shoot Extract, *Bambusa arundinacea* Stem Extract, *Bambusa arundinacea* Stem Powder, *Bambusa textilis* Stem Extract, *Bambusa vulgaris* Seed Extract, *Bambusa vulgaris* Callus Culture Extract, *Bambusa vulgaris* Juice, *Bambusa vulgaris* Leaf Extract, *Bambusa vulgaris* Sap Extract, *Bambusa vulgaris* Shoot Extract, *Bambusa vulgaris* Stem Extract, *Bambusa vulgaris* Stem Powder, or mixtures thereof;
b) at least one cosmetic ingredient obtained from *Maranta arundinaceae* (Arrowroot) selected from *Maranta arundinacea* (Arrowroot) Leaf Extract, *Maranta arundinacea* (Arrowroot) Root Extract, *Maranta arundinacea* (Arrowroot) Root Powder, or mixtures thereof;
c) at least one natural starch selected from maize (corn), rice, tapioca, cassava, barley, potato, wheat, sorghum, palm, pea, or mixtures thereof,
d) at least at least one fatty compound selected from:
d1) C6-C24 fatty alcohols selected from lauryl alcohol, myristyl alcohol, palmytil (cetyl) alcohol, palmitoyl alcohol, stearyl alcohol, cetearyl alcohol, isostearyl alcohol, 2-octyldodecanol, 2-ethylhexanoyl alcohol, oleyl alcohol, behenyl alcohol, erucyl alcohol, and mixtures thereof
d2) vegetable fats and oils, optionally hydrogenated or partially hydrogenated, selected from avocado oil, almond oil, hazelnut oil, babassu palm oil, borage oil, peanut oil, canola oil, hemp oil, milk thistle oil, safflower oil, chufa oil, coconut oil, rapeseed oil, black cumin oil, wheat germ oil, sunflower oil, linseed oil, macadamia nut oil, corn oil, walnut oil, olive oil and its by-products such as olive pomace oil, palm oil and its fractions such as palm olein and palm stearin, evening primrose oil, rosehip oil, castor oil, rice bran oil, apricot kernel oil, cottonseed oil, pumpkinseed oil, palm kernel oil and its fractions such as palm kernel olein and palm kernel stearin, grape seed oil, sesame oil, soy oil, cocoa butter, shea butter, Acetic/Linoleic/Palmitic Triglyceride, C8-12 Acid Triglyceride, C12-18 Acid Triglyceride, C18-36 Acid Triglyceride, Capric/Lauric/Myristic/Oleic Triglyceride, Caprylic/Capric/Lauric Triglyceride, Caprylic/Capric/Linoleic Triglyceride, Caprylic/Capric/Myristic/Stearic Triglyceride, Caprylic/Capric/Palmitic/Stearic Triglyceride, Caprylic/Capric/Stearic Triglyceride, Caprylic/Capric/Succinic Triglyceride, Caprylic/Capric Triglyceride, C10-40 Isoalkyl Acid Triglyceride, C10-18 Triglycerides, Docosahexenoic/Docosapentenoic/Oleic/Palmitic Triglyceride, Hydrogenated C12-18 Triglycerides, Jojoba Oil/Caprylic/Capric Triglyceride Esters, Lauric/Palmitic/Oleic Triglyceride, Mustelic/Palmitic Triglyceride, Oleic/Linoleic Triglyceride, Oleic/Palmitic/Lauric/Myristic/Linoleic Triglyceride, Oleic/Palmitic Triglyceride, Palmitic/Stearic Triglyceride, Ricinoleic/Caproic/Caprylic/Capric Triglyceride, and mixtures thereof;
d3) natural waxes selected from candelilla wax, carnauba wax, Japan wax, esparto wax, cork wax, guaruma wax, rice wax, sugar cane wax, ouricury wax, montan wax, beeswax, shellac wax, espermaceti, wool lanolin (wax), uropygial fat wax, ceresin waxes, peat waxes, ozokerite, and mixtures thereof;
and mixtures thereof.

In an embodiment, the antiperspirant/deodorant composition comprises, in a cosmetically acceptable medium, based on the total weight of the composition:
a) about 0.1-10 wt. % of at least one cosmetic ingredient obtained from Bamboo selected from *Bambusa arundinacea* Seed Extract, *Bambusa arundinacea* Juice,

*Bambusa arundinacea* Leaf Extract, *Bambusa arundinacea* Sap Extract, *Bambusa arundinacea* Shoot Extract, *Bambusa arundinacea* Stem Extract, *Bambusa arundinacea* Stem Powder, *Bambusa textilis* Stem Extract, *Bambusa vulgaris* Seed Extract, *Bambusa vulgaris* Callus Culture Extract, *Bambusa vulgaris* Juice, *Bambusa vulgaris* Leaf Extract, *Bambusa vulgaris* Sap Extract, *Bambusa vulgaris* Shoot Extract, *Bambusa vulgaris* Stem Extract, *Bambusa vulgaris* Stem Powder, or mixtures thereof;

b) about 0.1-40 wt. % of at least one cosmetic ingredient obtained from *Maranta arundinaceae* (Arrowroot) selected from *Maranta arundinacea* (Arrowroot) Leaf Extract, *Maranta arundinacea* (Arrowroot) Root Extract, *Maranta arundinacea* (Arrowroot) Root Powder, or mixtures thereof;

c) about 1-50 wt. % of at least one natural starch selected from maize (corn), rice, tapioca, cassava, barley, potato, wheat, sorghum, palm, pea, or mixtures thereof;

d) about 1-70 wt. % of at least at least one fatty compound selected from:

d1) C6-C24 fatty alcohols selected from lauryl alcohol, myristyl alcohol, palmytil (cetyl) alcohol, palmitoyl alcohol, stearyl alcohol, cetearyl alcohol, isostearyl alcohol, 2-octyldodecanol, 2-ethylhexanoyl alcohol, oleyl alcohol, behenyl alcohol, erucyl alcohol, and mixtures thereof;

d2) vegetable fats and oils, optionally hydrogenated or partially hydrogenated, selected from avocado oil, almond oil, hazelnut oil, babassu palm oil, borage oil, peanut oil, canola oil, hemp oil, milk thistle oil, safflower oil, chufa oil, coconut oil, rapeseed oil, black cumin oil, wheat germ oil, sunflower oil, linseed oil, macadamia nut oil, corn oil, walnut oil, olive oil and its by-products such as olive pomace oil, palm oil and its fractions such as palm olein and palm stearin, evening primrose oil, rosehip oil, castor oil, rice bran oil, apricot kernel oil, cottonseed oil, pumpkinseed oil, palm kernel oil and its fractions such as palm kernel olein and palm kernel stearin, grape seed oil, sesame oil, soy oil, cocoa butter, shea butter, Acetic/Linoleic/Palmitic Triglyceride, C8-12 Acid Triglyceride, C12-18 Acid Triglyceride, C18-36 Acid Triglyceride, Capric/Lauric/Myristic/Oleic Triglyceride, Caprylic/Capric/Lauric Triglyceride, Caprylic/Capric/Linoleic Triglyceride, Caprylic/Capric/Myristic/Stearic Triglyceride, Caprylic/Capric/Palmitic/Stearic Triglyceride, Caprylic/Capric/Stearic Triglyceride, Caprylic/Capric/Succinic Triglyceride, Caprylic/Capric Triglyceride, C10-40 Isoalkyl Acid Triglyceride, C10-18 Triglycerides, Docosahexenoic/Docosapentenoic/Oleic/Palmitic Triglyceride, Hydrogenated C12-18 Triglycerides, Jojoba Oil/Caprylic/Capric Triglyceride Esters, Lauric/Palmitic/Oleic Triglyceride, Mustelic/Palmitic Triglyceride, Oleic/Linoleic Triglyceride, Oleic/Palmitic/Lauric/Myristic/Linoleic Triglyceride, Oleic/Palmitic Triglyceride, Palmitic/Stearic Triglyceride, Ricinoleic/Caproic/Caprylic/Capric Triglyceride, and mixtures thereof;

d3) natural waxes selected from candelilla wax, carnauba wax, Japan wax, esparto wax, cork wax, guaruma wax, rice wax, sugar cane wax, ouricury wax, montan wax, beeswax, shellac wax, espermaceti, wool lanolin (wax), uropygial fat wax, ceresin waxes, peat waxes, ozokerite, and mixtures thereof;

and mixtures thereof.

In an embodiment, the antiperspirant/deodorant composition comprises, in a cosmetically acceptable medium, based on the total weight of the composition:

a) about 0.5-5 wt. % of at least one cosmetic ingredient obtained from Bamboo selected from *Bambusa arundinacea* Seed Extract, *Bambusa arundinacea* Juice, *Bambusa arundinacea* Leaf Extract, *Bambusa arundinacea* Sap Extract, *Bambusa arundinacea* Shoot Extract, *Bambusa arundinacea* Stem Extract, *Bambusa arundinacea* Stem Powder, *Bambusa textilis* Stem Extract, *Bambusa vulgaris* Seed Extract, *Bambusa vulgaris* Callus Culture Extract, *Bambusa vulgaris* Juice, *Bambusa vulgaris* Leaf Extract, *Bambusa vulgaris* Sap Extract, *Bambusa vulgaris* Shoot Extract, *Bambusa vulgaris* Stem Extract, *Bambusa vulgaris* Stem Powder, or mixtures thereof;

b) about 1-35 wt. % of at least one cosmetic ingredient obtained from *Maranta arundinaceae* (Arrowroot) selected from *Maranta arundinacea* (Arrowroot) Leaf Extract, *Maranta arundinacea* (Arrowroot) Root Extract, *Maranta arundinacea* (Arrowroot) Root Powder, or mixtures thereof;

c) about 5-40 wt. % of at least one natural starch selected from maize (corn), rice, tapioca, cassava, barley, potato, wheat, sorghum, palm, pea, or mixtures thereof;

d) about 3-68 wt. % of at least at least one fatty compound selected from:

d1) C6-C24 fatty alcohols selected from lauryl alcohol, myristyl alcohol, palmytil (cetyl) alcohol, palmitoyl alcohol, stearyl alcohol, cetearyl alcohol, isostearyl alcohol, 2-octyldodecanol, 2-ethylhexanoyl alcohol, oleyl alcohol, behenyl alcohol, erucyl alcohol, and mixtures thereof, d2) vegetable fats and oils, optionally hydrogenated or partially hydrogenated, selected from avocado oil, almond oil, hazelnut oil, babassu palm oil, borage oil, peanut oil, canola oil, hemp oil, milk thistle oil, safflower oil, chufa oil, coconut oil, rapeseed oil, black cumin oil, wheat germ oil, sunflower oil, linseed oil, macadamia nut oil, corn oil, walnut oil, olive oil and its by-products such as olive pomace oil, palm oil and its fractions such as palm olein and palm stearin, evening primrose oil, rosehip oil, castor oil, rice bran oil, apricot kernel oil, cottonseed oil, pumpkinseed oil, palm kernel oil and its fractions such as palm kernel olein and palm kernel stearin, grape seed oil, sesame oil, soy oil, cocoa butter, shea butter, Acetic/Linoleic/Palmitic Triglyceride, C8-12 Acid Triglyceride, C12-18 Acid Triglyceride, C18-36 Acid Triglyceride, Capric/Lauric/Myristic/Oleic Triglyceride, Caprylic/Capric/Lauric Triglyceride, Caprylic/Capric/Linoleic Triglyceride, Caprylic/Capric/Myristic/Stearic Triglyceride, Caprylic/Capric/Palmitic/Stearic Triglyceride, Caprylic/Capric/Stearic Triglyceride, Caprylic/Capric/Succinic Triglyceride, Caprylic/Capric Triglyceride, C10-40 Isoalkyl Acid Triglyceride, C10-18 Triglycerides, Docosahexenoic/Docosapentenoic/Oleic/Palmitic Triglyceride, Hydrogenated C12-18 Triglycerides, Jojoba Oil/Caprylic/Capric Triglyceride Esters, Lauric/Palmitic/Oleic Triglyceride, Mustelic/Palmitic Triglyceride, Oleic/Linoleic Triglyceride, Oleic/Palmitic/Lauric/Myristic/Linoleic Triglyceride, Oleic/Palmitic Triglyceride, Palmitic/Stearic Triglyceride, Ricinoleic/Caproic/Caprylic/Capric Triglyceride, and mixtures thereof;

d3) natural waxes selected from candelilla wax, carnauba wax, Japan wax, esparto wax, cork wax, guaruma wax, rice wax, sugar cane wax, ouricury wax, montan wax, beeswax, shellac wax, espermaceti, wool lanolin (wax), uropygial fat wax, ceresin waxes, peat waxes, ozokerite, and mixtures thereof;

and mixtures thereof.

In an embodiment, the antiperspirant/deodorant composition comprises, in a cosmetically acceptable medium, based on the total weight of the composition:
- a) about 0.8-3 wt. % of at least one cosmetic ingredient obtained from Bamboo selected from *Bambusa arundinacea* Seed Extract, *Bambusa arundinacea* Juice, *Bambusa arundinacea* Leaf Extract, *Bambusa arundinacea* Sap Extract, *Bambusa arundinacea* Shoot Extract, *Bambusa arundinacea* Stem Extract, *Bambusa arundinacea* Stem Powder, *Bambusa textilis* Stem Extract, *Bambusa vulgaris* Seed Extract, *Bambusa vulgaris* Callus Culture Extract, *Bambusa vulgaris* Juice, *Bambusa vulgaris* Leaf Extract, *Bambusa vulgaris* Sap Extract, *Bambusa vulgaris* Shoot Extract, *Bambusa vulgaris* Stem Extract, *Bambusa vulgaris* Stem Powder, or mixtures thereof;
- b) about 5-25 wt. % of at least one cosmetic ingredient obtained from *Maranta arundinaceae* (Arrowroot) selected from *Maranta arundinacea* (Arrowroot) Leaf Extract, *Maranta arundinacea* (Arrowroot) Root Extract, *Maranta arundinacea* (Arrowroot) Root Powder, or mixtures thereof;
- c) about 12-35 wt. % of at least one natural starch selected from maize (corn), rice, tapioca, cassava, barley, potato, wheat, sorghum, palm, pea, or mixtures thereof;
- d) about 5-65 wt. % of at least at least one fatty compound selected from:
  - d1) C6-C24 fatty alcohols selected from lauryl alcohol, myristyl alcohol, palmytil (cetyl) alcohol, palmitoyl alcohol, stearyl alcohol, cetearyl alcohol, isostearyl alcohol, 2-octyldodecanol, 2-ethylhexanoyl alcohol, oleyl alcohol, behenyl alcohol, erucyl alcohol, and mixtures thereof;
  - d2) vegetable fats and oils, optionally hydrogenated or partially hydrogenated, selected from avocado oil, almond oil, hazelnut oil, babassu palm oil, borage oil, peanut oil, canola oil, hemp oil, milk thistle oil, safflower oil, chufa oil, coconut oil, rapeseed oil, black cumin oil, wheat germ oil, sunflower oil, linseed oil, macadamia nut oil, corn oil, walnut oil, olive oil and its by-products such as olive pomace oil, palm oil and its fractions such as palm olein and palm stearin, evening primrose oil, rosehip oil, castor oil, rice bran oil, apricot kernel oil, cottonseed oil, pumpkinseed oil, palm kernel oil and its fractions such as palm kernel olein and palm kernel stearin, grape seed oil, sesame oil, soy oil, cocoa butter, shea butter, Acetic/Linoleic/Palmitic Triglyceride, C8-12 Acid Triglyceride, C12-18 Acid Triglyceride, C18-36 Acid Triglyceride, Capric/Lauric/Myristic/Oleic Triglyceride, Caprylic/Capric/Lauric Triglyceride, Caprylic/Capric/Linoleic Triglyceride, Caprylic/Capric/Myristic/Stearic Triglyceride, Caprylic/Capric/Palmitic/Stearic Triglyceride, Caprylic/Capric/Stearic Triglyceride, Caprylic/Capric/Succinic Triglyceride, Caprylic/Capric Triglyceride, C10-40 Isoalkyl Acid Triglyceride, C10-18 Triglycerides, Docosahexenoic/Docosapentenoic/Oleic/Palmitic Triglyceride, Hydrogenated C12-18 Triglycerides, Jojoba Oil/Caprylic/Capric Triglyceride Esters, Lauric/Palmitic/Oleic Triglyceride, Mustelic/Palmitic Triglyceride, Oleic/Linoleic Triglyceride, Oleic/Palmitic/Lauric/Myristic/Linoleic Triglyceride, Oleic/Palmitic Triglyceride, Palmitic/Stearic Triglyceride, Ricinoleic/Caproic/Caprylic/Capric Triglyceride, and mixtures thereof;
  - d3) natural waxes selected from candelilla wax, carnauba wax, Japan wax, esparto wax, cork wax, guaruma wax, rice wax, sugar cane wax, ouricury wax, montan wax, beeswax, shellac wax, espermaceti, wool lanolin (wax), uropygial fat wax, ceresin waxes, peat waxes, ozokerite, and mixtures thereof;

and mixtures thereof.

In an embodiment, the antiperspirant/deodorant composition comprises, in a cosmetically acceptable medium:
- a) *Bambusa arundinacea* Stem Powder;
- b) *Maranta arundinacea* (Arrowroot) Root Powder;
- c) at least one natural starch selected from maize (corn), tapioca, or mixtures thereof;
- d) at least at least one fatty compound selected from:
  - d1) C6-C24 fatty alcohols selected from palmytil (cetyl) alcohol, palmitoyl alcohol, stearyl alcohol, cetearyl alcohol, oleyl alcohol, and mixtures thereof;
  - d2) vegetable fats and oils, optionally hydrogenated or partially hydrogenated, selected from avocado oil, almond oil, hazelnut oil, babassu palm oil, borage oil, peanut oil, canola oil, hemp oil, milk thistle oil, safflower oil, chufa oil, coconut oil, rapeseed oil, black cumin oil, wheat germ oil, sunflower oil, linseed oil, macadamia nut oil, corn oil, walnut oil, olive oil and its by-products such as olive pomace oil, palm oil and its fractions such as palm olein and palm stearin, evening primrose oil, rosehip oil, castor oil, rice bran oil, apricot kernel oil, cottonseed oil, pumpkinseed oil, palm kernel oil and its fractions such as palm kernel olein and palm kernel stearin, grape seed oil, sesame oil, soy oil, cocoa butter, shea butter, Caprylic/Capric Triglyceride, and mixtures thereof,
  - d3) natural waxes selected from candelilla wax, carnauba wax, rice wax, sugar cane wax, beeswax, shellac wax, espermaceti, wool lanolin (wax), ceresin waxes, ozokerite, and mixtures thereof, and mixtures thereof.

In an embodiment, the antiperspirant/deodorant composition comprises, in a cosmetically acceptable medium, based on the total weight of the composition:
- a) 0.1-10 wt. % of *Bambusa arundinacea* Stem Powder;
- b) 0.1-40 wt. % of *Maranta arundinacea* (Arrowroot) Root Powder;
- c) 1-50 wt. % of at least one natural starch selected from maize (corn), tapioca, or mixtures thereof;
- d) 1-70 wt. % at least at least one fatty compound selected from:
  - d1) C6-C24 fatty alcohols selected from palmytil (cetyl) alcohol, palmitoyl alcohol, stearyl alcohol, cetearyl alcohol, oleyl alcohol, and mixtures thereof;
  - d2) vegetable fats and oils, optionally hydrogenated or partially hydrogenated, selected from avocado oil, almond oil, hazelnut oil, babassu palm oil, borage oil, peanut oil, canola oil, hemp oil, milk thistle oil, safflower oil, chufa oil, coconut oil, rapeseed oil, black cumin oil, wheat germ oil, sunflower oil, linseed oil, macadamia nut oil, corn oil, walnut oil, olive oil and its by-products such as olive pomace oil, palm oil and its fractions such as palm olein and palm stearin, evening primrose oil, rosehip oil, castor oil, rice bran oil, apricot kernel oil, cottonseed oil, pumpkinseed oil, palm kernel oil and its fractions such as palm kernel olein and palm kernel stearin, grape seed oil, sesame oil, soy oil, cocoa butter, shea butter, Caprylic/Capric Triglyceride, and mixtures thereof d3) natural waxes selected from candelilla wax, carnauba wax, rice wax, sugar cane wax, beeswax, shellac wax, espermaceti, wool lanolin (wax), ceresin waxes, ozokerite, and mixtures thereof;

and mixtures thereof.

Other Ingredients

The antiperspirant/deodorant compositions of the present disclosure may contain additional optional components. Additional optional components may include, for example, additional deodorant actives, pigments, perfumes or fragrances, thickeners, particulate and filler materials, distributing agents, emulsifiers, wash-off agents, bacteriostats, fungistats, and mixtures thereof. Optional components useful herein are described in, for example, the International Cosmetic Ingredient Dictionary and Handbook by CTFA, 10th Edition (2004).

Additional deodorant actives include, but are not limited to, sodium bicarbonate, triethyl citrate, ethylhexylglycerin, ethyl lauroyl arginate and/or its salts such as the hydrochloride salt, caprylic acid, polyglycerol caprylate, xylitol, phenoxyethanol, 1,2-hexanediol, caprylyl glycol and mixtures thereof.

The antiperspirant/deodorant compositions may also contain inorganic pigments. Suitable inorganic pigments include, but are not limited to, those having a color index number as listed in the CTFA dictionary, 10th edition, 2004, hereby incorporated by reference.

For purposes of this disclosure, the term "fragrance" refers to any substance, natural or synthetic, used to impart an odor to a product.

For purposes of this disclosure, the term "perfume" refers to any mixture of fragrant essential oils and aroma compounds, fixatives, and solvents used to give the human body, objects, and living spaces a lasting and pleasant smell.

When perfumes or fragrances are used, they may be present at concentrations up to around 4%, such as from about 0.25 to about 3 wt. %, based on the total weight of the composition.

Thickeners may include, but are not limited to, anionic, synthetic polymers, cationic synthetic polymers, naturally occurring thickeners, such as nonionic guar gums, scleroglucan gums or xanthan gums, gum arabic, gum ghatti, karaya gum, tragacanth gum, carrageenan gum, agar-agar, locust bean gum, pectins, alginates, starch fractions, and derivatives such as amylose, amylopectin, and dextrins, as well as cellulose and cellulose derivatives such as, for example, methylcellulose, carboxyalkylcelluloses, and hydroxyalkylcelluloses, nonionic, fully synthetic polymers, such as polyvinyl alcohol or polyvinylpyrrolidinone; as well as inorganic thickeners, in particular phyllosilicates such as, for example, bentonite, in particular smectites, such as montmorillonite or hectorite. Thickeners may be included at from about 0.001-20 wt. %, or about 0.005-15 wt. %, or about 0.01-12 wt. %, based on the total weight of the composition.

Particulate and filler materials also may be included. These materials may be included at from about 0.001 to about 5 wt. %, or about 0.5 to about 3 wt. %, based on the total weight of the composition. Suitable filler materials include colloidial silica (such as Cab-O-Sil, sold by Cabot Corp), clays (such as bentonite, diatomite, illite, kaolin clay, montmorillonite and the like), hydrophobic (quaternized) clays, silica/alumina thickeners, silicate powders such as talc, alumina silicate, and magnesium silicate, metallic stearates, and mixtures thereof.

Emulsifiers may include non-ionic surfactants useful for forming water-in-oil emulsions. The level of emulsifiers used in the presently disclosed compositions may be about 0.001 to about 10 wt. %, or about 0.5 to about 5 wt. %, based on the total weight of the composition. Non-limiting examples of emulsifiers include polyoxyethylene ethers of fatty alcohols, and polyoxyethylene-polysiloxane copolymers.

Wash-off agents may be utilized to improve the ease with which the ingredients, particularly the C6-C24 fatty alcohols, vegetable fats and oils and natural waxes, may be washed off from skin or clothing. The wash-off agent may be a non-liquid. The wash-off agent may be present at about 0.001 to about 10 wt. %, or 0.5 to about 5 wt. %, based on the total weight of the composition. Wash-off agents may include nonionic surfactants such as esters or ethers containing a C4 to C22 alkyl moiety and a hydrophilic moiety which can comprise a polyoxyalkylene group (POE or POP) and/or a polyol. Non-limiting examples of wash-off agents include: ceteth-2 through ceteth-30, steareth-2 through steareth-30, such as steareth-21, ceteareth-2 through ceteareth-30, such as ceteareth-20, PEG-2 stearate through PEG-30 stearate, such as PEG-20 stearate, PEG-12 isostearate, PEG-16 hydrogenated castor oil, PEG-40 hydrogenated castor oil, and PEG-20 glyceryl stearate.

Further optional components may include skin benefit agents, such as allantoin or lipids, in an amount up to about 5 wt. % based on the total weight of the composition, skin cooling agents other than the already mentioned alcohols, such as menthol and menthol derivatives, in an amount up to about 2 wt. % based on the total weight of the composition.

No particular limitation is imposed on the form of the antiperspirant/deodorant compositions of the present disclosure. Examples include roll-on, gel, stick or cream.

Method of Cosmetically Treating Body Odor

An embodiment includes a method of cosmetically treating body odor by applying to the skin an antiperspirant/deodorant composition as disclosed herein. The body odor may be axillary odor. The compositions may be applied to the axillae. Application of the compositions may help to reduce body odor, reduce sweat production, and/or increase wetness absorption compared to no application of the compositions. Application of the compositions may help to reduce body odor, reduce sweat production, and/or increase wetness absorption compared to known antiperspirant/deodorant compositions.

EXAMPLES

The following examples are given in order to provide a person skilled in the art with a sufficiently clear and complete explanation of the present disclosure, but should not be considered as limiting of the essential aspects of its subject, as set out in the preceding portions of this description. Similarly, all percentages are weight/weight percentages unless otherwise indicated. Except in the operating and comparative examples, or where otherwise explicitly indicated, all numbers in this description and claims indicating amounts of material or conditions of reaction, physical properties of materials and/or use are to be understood as modified by the word "about". "About" is understood to mean that a given value could vary by 10%. Numerical ranges expressed in the format "from x to y" are understood to include x and y. When for a specific feature multiple preferred ranges are described in the format "from x to y", it is understood that all ranges combining the different endpoints are also contemplated.

The compositions of Table 1 and Table 2 were prepared by placing the oil(s), fatty alcohol(s) and wax(es) (when present) in a main kettle having a homogenizer mill attached and heating to about 85-95° C. Once this mixture became molten, the milling started while maintaining the temperature at about 85-95° C. until complete homogenization. The mixture was further milled for about 15 minutes.

Caprylic/capric triglyceride and triethyl citrate (when present) were charged in a side kettle fitted with a homogenizer mill. This mixture was agitated and corn starch was added to the side kettle. The mixture was agitated until complete homogenization.

Arrowroot Root Extract was added to the side kettle while maintaining the agitation. The mixture was agitated until complete homogenization.

Bamboo powder, a thickener (when present), a filler (when present) and sodium bicarbonate (when present) were added to the side kettle while maintaining the agitation. The mixture was agitated until complete homogenization, which took about 15 min. Then the mixture was agitated again for about 30 min at a temperature of about 50-65° C. After that, tapioca starch was added to the side kettle while maintaining the temperature of about 50-65° C. The mixture was agitated until complete homogenization.

The mixture of the side kettle was transferred into the main kettle at a temperature of about 55-65° C. The mixture was agitated (at least for 15 min) until complete homogenization.

The fragrance was added to the main kettle at a temperature of about 55-65° C. The mixture was agitated (at least for 15 min) until complete homogenization.

The final mixture was cooled to 25° C.

TABLE 1

Antiperspirant/deodorant compositions (wt. % based on the total weight of the composition).

| Ingredients | C1 | C2 | C3 | C4 | C5 | C6 |
|---|---|---|---|---|---|---|
| Oil(s) | 13.0 | 13.0 | 14.0 | 14.0 | 13.0 | 38.0 |
| C6-C24 Fatty alcohol(s) | 13.0 | 13.0 | 9.0 | 7.0 | 11.5 | 11.5 |
| Wax(es) | — | — | — | — | — | — |
| Caprylic/Capric Triglyceride | 35.0 | 35.0 | 35.0 | 36.0 | 35.0 | 9.0 |
| Zea Mays (Corn) Starch | 17.0 | 7.0 | 7.0 | 7.0 | 17.0 | 18.0 |
| Tapioca Starch | 10.0 | 17.0 | 17.0 | 17.0 | 10.0 | 10.0 |
| Maranta Arundinacea (Arrowroot) Root Extract | 5.0 | 11.0 | 14.0 | 14.0 | 7.5 | 7.5 |
| Bambusa Arundinacea Stem Powder | 2.0 | 2.0 | 2.0 | 2.0 | 1.0 | 1.0 |
| Sodium Bicarbonate | — | — | — | — | — | — |
| Triethyl Citrate | — | — | — | — | — | — |
| Thickener(s), Filler(s) | 4.0 | 1.0 | 1.0 | 1.0 | 1.0 | 2.0 |
| Parfum (Fragrance) | 1.0 | 1.0 | 1.0 | 2.0 | 3.0 | 3.0 |

TABLE 2

Antiperspirant/deodorant compositions (wt. % based on the total weight of the composition).

| Ingredients | C7 | C8 | C9 | C10 | C11 | C12 |
|---|---|---|---|---|---|---|
| Oil(s) | 16.5 | 13.0 | 13.0 | 13.0 | 21.5 | 15.5 |
| C6-C24 Fatty alcohol(s) | 10.0 | 10.0 | 10.0 | 10.0 | — | 10.0 |
| Wax(es) | — | — | — | — | 0.5 | — |
| Caprylic/Capric Triglyceride | 33.0 | 32.0 | 32.0 | 31.0 | 32.0 | 30.0 |
| Zea Mays (Corn) Starch | 17.0 | 17.0 | 18.0 | 18.0 | 17.0 | 17.0 |
| Tapioca Starch | 6.0 | 10.0 | 10.0 | 10.0 | 10.0 | 10.0 |
| Maranta Arundinacea (Arrowroot) Root Extract | 7.5 | 8.0 | 8.0 | 8.0 | 8.0 | 7.5 |
| Bambusa Arundinacea Stem Powder | 1.0 | 1.0 | 1.0 | 1.0 | 1.0 | 1.0 |
| Sodium Bicarbonate | 5.0 | 5.0 | 5.0 | 5.0 | 5.0 | 5.0 |
| Triethyl Citrate | — | 2.0 | 2.0 | 2.0 | 2.0 | — |
| Thickener(s), Filler(s) | 1.0 | — | — | — | 1.0 | — |
| Parfum (Fragrance) | 2.0 | 2.0 | 1.0 | 2.0 | 2.0 | 3.0 |

Consumer Test

The antiperspirant/deodorant composition C8 described above was tested in terms of wetness perception and odor protection in a consumer test.

23 panelists used the product daily for 2 weeks. A week prior to the start the study, the panelists were provided a blinded deodorant stick. They were instructed to use the stick for 7 days as a precautionary measure to help wash out aluminum salts from the axilla of antiperspirant users.

Following 2 weeks of product use, panelists made one final application and immediately answered an initial application questionnaire. Panelists were instructed not to shower or apply any other underarm product for the next 24 hours. 8 hours and 24 hours following application, the panelists answered additional wear questionnaires. Questionnaire data was analyzed by the Qualtrics software.

The acceptance was rated in accordance with the following criteria: 1 (unacceptable); 2 (very poor); 3 (poor); 4 (fair); 5 (good); 6 (very good); 7 (excellent).

21 of 23 panelist rated from good to excellent the overall wear at 8 hours. 21 of 23 panelist rated from good to excellent the overall wear at 24 hours.

23 of 23 panelist rated from good to excellent the underarm feel dry sensation at 8 hours. 20 of 23 panelist rated from good to excellent the underarm feel dry sensation at 24 hours.

23 of 23 panelist rated from good to excellent the no underarm odor at 8 hours. 17 of 23 panelist rated from good to excellent the no underarm odor at 24 hours.

From the experimental results, it can be concluded that the antiperspirant/deodorant compositions of the present disclosure exhibit clear wetness efficacy that persisted for up to 24 hours.

Instrumental Test

The wetness absorption efficacy of composition C9 described above in Table 2 and the commercially available products listed below (Comparative Experiments ("CE") 1-4) was tested using the protocol described below.

CE1. Soft & Gentle Anti-Perspirant Active 0% Aluminium (Roll-on)

Ingredients: Aqua, Propylene Glycol, Cyclopentasiloxane, PPG-11 Stearyl Ether, Steareth-2, Isopropyl Myristate, *Bambusa arundinacea* Stem Extract, Steareth-20, Phenoxyethanol, Xantham Gum, Parfum, Citric Acid, Ethylhexylglycerin, Equisetum *Arvense* Extract, *Salvia officinalis* (Sage) Oil, BHT.

CE2. Love Beauty and Planet Argan Oil & Lavender Relaxing Deodorant (Stick)

Ingredients: Propanediol, Water (Eau), Glycerin, Sodium Stearate, Silica, Zinc Ricinoleate, Fragrance (Parfum), *Zea mays* (Corn) Starch, *Lavandula angustifolia* (Lavender) Oil, *Cocos nucifera* (Coconut) Oil, *Argania spinosa* Kernel Oil, Polyglyceryl-3 Caprate, *Saccharomyces* Ferment, Grapefruit Seed Extract, Sodium Bicarbonate, Alpha-Isomethyl Ionone, Citronellol, Coumarin, Geraniol, Hydroxycitronellal, Limonene, Linalool.

CE3. Native Deodorant *Eucalyptus* & Mint (Stick)

Ingredients: Caprylic/Capric Triglyceride, Tapioca Starch, Ozokerite, Sodium Bicarbonate, Magnesium Hydroxide, *Cocos nucifera* (Coconut) Oil, Cyclodextrin, *Butyrospermum parkii* (Shea) Butter, Fragrance, Dextrose, *Lactobacillus acidophilus, Eucalyptus* Leaf Oil.

CE4. Schmidt's® Natural Deodorant Lavender+Sage (Stick)

Ingredients: *Maranta arundinacea* (arrowroot) Powder, Sodium Bicarbonate (Baking soda), *Cocos nucifera* (Coconut) Oil, *Butyrospermum parkii* (Shea) Butter, Caprylic/Capric Triglyceride (fractionated Coconut Oil), *Euphorbia cerifera* (Candelilla) Wax, *Simmondsia chinesis* (Jojoba) Seed Oil, Magnesium Hydroxide, *Lavandula hybrida* (Lavandin) Oil, *Salvia sclarea* (Clary Sage) Essential Oil), Tocopherol (Vitamin E, sunflower derived).

Each of the compositions were applied to the backs of a panel of 20 volunteers. For each composition, there was an untreated control area located contralateral to the test area. The size of each control and test area was about 2 cm×3.5 cm. About 40 mg of each composition was applied (approximately 2 mg/cm³).

For testing, the panelists came to the study site. The products were applied as described above. After 20 minutes of adsorption time, panelists were allowed to leave the study site. Panelists returned to the study site more than 30 minutes prior to instrumental measurements and remained in a climate-controlled room (26±2° C. and 50±5% relative humidity) until measurements started 4 hours (±minutes) after application.

During measurements, panelists lay in a prone position and dielectric permittivity of each control and test area was determined by using Epsilon Model E100 (Biox Systems Ltd) as described in Malcher B, et al. "Capacitive Contact Imaging—New Clinical Screening Method for Aluminum Free Products". SOFW 2019; 145(3): 28-34.

All tested compositions demonstrated a statistically significant relative capacitance reduction (95% Confidence Interval), which correlates with sweat reduction. The results are indicated in Table 3.

TABLE 3

Average of Relative Capacitance Reduction (%) 4 hours after application

| Composition | Relative Capacitance Reduction |
| --- | --- |
| CE1 | 11 |
| CE2 | 24 |
| CE3 | 26 |
| CE4 | 24 |
| C9 | 43 |

Composition C9 demonstrated a higher relative capacitance reduction when compared to commercially available products CE1 to CE4.

From the experimental results, it can be concluded that the antiperspirant/deodorant compositions of the present disclosure exhibit clear sweat reduction.

Modifications that do not affect, alter, change or modify the essential aspects of the compositions and methods described above, are included within the scope of the present disclosure.

The invention claimed is:

1. An antiperspirant/deodorant composition comprising, based on a total weight of the composition:
   a. about 0.5-10 wt. % of at least one cosmetic ingredient obtained from Bamboo selected from *Bambusa arundinacea* Seed Extract, *Bambusa arundinacea* Juice, *Bambusa arundinacea* Leaf Extract, *Bambusa arundinacea* Sap Extract, *Bambusa arundinacea* Shoot Extract, *Bambusa arundinacea* Stem Extract, *Bambusa arundinacea* Stem Powder, *Bambusa textilis* Stem Extract, *Bambusa vulgaris* Seed Extract, *Bambusa vulgaris* Callus Culture Extract, *Bambusa vulgaris* Juice, *Bambusa vulgaris* Leaf Extract, *Bambusa vulgaris* Sap Extract, *Bambusa vulgaris* Shoot Extract, *Bambusa vulgaris* Stem Extract, *Bambusa vulgaris* Stem Powder, or mixtures thereof;
   b. about 4-35 wt. % of at least one cosmetic ingredient obtained from *Maranta arundinaceae* (Arrowroot) selected from *Maranta arundinacea* (Arrowroot) Leaf Extract, *Maranta arundinacea* (Arrowroot) Root Extract, *Maranta arundinacea* (Arrowroot) Root Powder, or mixtures thereof; and
   c. about 12-35 wt. % of at least one natural starch selected from maize (corn), rice, tapioca, cassava, barley, potato, wheat, sorghum, palm, pea, or mixtures thereof, wherein a, b, and c accounts for at least 31 wt. % and up to 40 wt. %, of the composition;
   about 5-20 wt. % of at least one C6-C24 fatty alcohol selected from lauryl alcohol, myristyl alcohol, palmytil (cetyl) alcohol, palmitoyl alcohol, stearyl alcohol, cetearyl alcohol, isostearyl alcohol, 2-octyldodecanol, 2-ethylhexanoyl alcohol, oleyl alcohol, behenyl alcohol, erucyl alcohol, or mixtures thereof, and a cosmetically acceptable medium accounting for a balance of the composition.

2. The antiperspirant/deodorant composition according to claim 1, additionally comprising at least one additional fatty compound selected from vegetable fats and oils, natural waxes or mixtures thereof.

3. The antiperspirant/deodorant composition according to claim 2, wherein the at least one additional fatty compound is present at a total concentration ranging from about 1 to about 70 wt. %, based on the total weight of the composition.

4. The antiperspirant/deodorant composition according to claim 1, wherein the composition is in the form of a roll-on, gel, stick or cream.

5. A method for the cosmetic treatment of body odors, comprising applying to the skin an antiperspirant/deodorant composition according to claim 1.

6. The method of claim 5, wherein the body odors include axillary odors.

7. The method of claim 5, wherein the antiperspirant/deodorant composition is applied to the axillae.

8. The antiperspirant/deodorant composition according to claim 1, wherein the composition is in the form of a stick.

9. The antiperspirant/deodorant composition according to claim 1, wherein the composition has an increased relative capacitance reduction.

* * * * *